United States Patent
Reith et al.

(10) Patent No.: US 12,545,159 B2
(45) Date of Patent: Feb. 10, 2026

(54) SUSPENSION SYSTEM FOR VEHICLE BACKREST AND BACKREST

(71) Applicant: FAURECIA Sièges d'Automobile, Nanterre (FR)

(72) Inventors: Carsten Reith, Niedernwöhren (DE); Abhijeet Pharate, Pune (IN); Marine Michaud, Paris (FR)

(73) Assignee: FAURECIA Sièges d'Automobile, Nanterre (FR)

( * ) Notice: Subject to any disclaimer, the term of this patent is extended or adjusted under 35 U.S.C. 154(b) by 235 days.

(21) Appl. No.: 18/400,435

(22) Filed: Dec. 29, 2023

(65) Prior Publication Data
US 2024/0217406 A1 Jul. 4, 2024

(30) Foreign Application Priority Data
Jan. 4, 2023 (FR) ...................................... 2300085

(51) Int. Cl.
| | |
|---|---|
| *B60N 2/66* | (2006.01) |
| *B60N 2/50* | (2006.01) |
| *B60N 2/56* | (2006.01) |
| *B60R 1/00* | (2022.01) |

(52) U.S. Cl.
CPC .................................. *B60N 2/503* (2013.01)

(58) Field of Classification Search
CPC .. B60N 2/7094; B60N 2/986; B60N 2/02246; B60N 2/2222; B60N 2/64; B60N 2/643
USPC ........................................... 297/218.1, 284.3
See application file for complete search history.

(56) References Cited

U.S. PATENT DOCUMENTS

| | | | |
|---|---|---|---|
| 6,692,074 B1 | 2/2004 | Kopetzky | |
| 9,409,504 B2* | 8/2016 | Line | B60N 2/986 |
| 9,415,713 B2* | 8/2016 | Line | B60N 2/02246 |
| 9,873,360 B2* | 1/2018 | Line | B60N 2/4279 |
| 10,239,421 B2* | 3/2019 | Katoh | B60N 2/682 |
| 11,833,946 B2* | 12/2023 | Pinto | B60N 2/4221 |
| 12,077,076 B2* | 9/2024 | Mauffrey | B60N 2/6009 |
| 2005/0040686 A1* | 2/2005 | Van-Thournout | B60N 2/6671 |
| | | | 297/284.4 |

(Continued)

FOREIGN PATENT DOCUMENTS

| | | |
|---|---|---|
| DE | 20221092 U1 | 12/2004 |
| FR | 3117068 | 6/2022 |
| WO | 2006081865 A1 | 8/2006 |

OTHER PUBLICATIONS

French Search Report for Priority French Patent App. No. FR2300085 dated Oct. 6, 2023, 4 pages, No English Translation Available.

*Primary Examiner* — Shin H Kim
(74) *Attorney, Agent, or Firm* — Barnes & Thornburg LLP

(57) ABSTRACT

A suspension system for a backrest of a vehicle seat, wherein the suspension system comprises:
 a main support, the main support has a main plate,
 an ancillary support, the ancillary support has an ancillary plate, the ancillary plate has a central portion extending along the extension of the main plate in an elevation direction, and
 a structural core extending in the elevation direction between an upper structural end and a lower structural end, the upper structural end and the lower structural end are intended to be attached to a frame, the main support and the ancillary support are attached to the structural core.

10 Claims, 9 Drawing Sheets

(56) References Cited

U.S. PATENT DOCUMENTS

| | | | | |
|---|---|---|---|---|
| 2014/0203603 | A1* | 7/2014 | Line | B60N 2/7005 |
| | | | | 297/284.3 |
| 2015/0145303 | A1* | 5/2015 | Line | B60N 2/643 |
| | | | | 297/283.3 |
| 2017/0313216 | A1* | 11/2017 | Line | B60N 2/2222 |
| 2018/0072187 | A1* | 3/2018 | Katoh | B60N 2/682 |
| 2020/0070699 | A1* | 3/2020 | Kakishima | B60N 2/72 |
| 2020/0139867 | A1 | 5/2020 | Ceglarek | |
| 2021/0162893 | A1* | 6/2021 | Mazzamurro | B60N 2/85 |
| 2022/0258655 | A1* | 8/2022 | Pinto | B60N 2/4256 |
| 2024/0375568 | A1* | 11/2024 | Mauffrey | B60N 2/6009 |

* cited by examiner

SUSPENSION SYSTEM FOR VEHICLE BACKREST AND BACKREST

PRIORITY CLAIM

This application claims priority to French Patent Application No. FR2300085, filed Jan. 4, 2023, which is expressly incorporated by reference herein.

BACKGROUND

The present disclosure relates to a suspension system for a vehicle backrest, in particular a motor vehicle. The present disclosure also relates to a vehicle seat comprising such a backrest.

SUMMARY

According to the present disclosure, a suspension system for a vehicle backrest comprises:
- a main support, the main support has a main plate, the main plate extends in a transverse direction between a first-side main edge and a second-side main edge,
- an ancillary support, the ancillary support (is distinct from the main support and) has an ancillary plate, the ancillary plate has a central portion (adjacent to and) extending along the extension of the main plate (it has an edge extending opposite an edge of the main plate) along an elevation direction perpendicular to the transverse direction, and
- a structural core extending along the elevation direction between an upper structural end and a lower structural end, the upper structural end and the lower structural end are intended to be attached to a frame (of a backrest), the main support and the ancillary support are attached to the structural core.

In illustrative embodiments, the structural core performs a suspension function. The suspension system constitutes a module formed by the structural core, the main support and the ancillary support, all the members constituting the module being held together. The production of the backrest is thus facilitated. In particular, in the case where the module is attached to the frame (of the backrest) in a place away from the manufacturing site of the suspension system, the transport of the suspension system is facilitated.

In illustrative embodiments, the structural core preferably comprises at least one wire having a cross-section comprised between 10 square millimeters and 100 square millimeters In illustrative embodiments, the structural core allows a robust holding of the main support and of the ancillary support, in order to connect them to the frame (of the backrest), while allowing a deflection of movement to comfortably accommodate the back of a user.

In illustrative embodiments, the structural core comprises a first-side wire portion and a second-side wire portion, the first-side wire portion and the second-side wire portion are separated from one another along the transverse direction by a distance of at least 20 centimeters, and the main support is attached to the first-side wire portion and to the second-side wire portion.

In illustrative embodiments, the movement of the main support and of the ancillary support relative to the frame (of the backrest) will be effectively controlled, in particular the rotational movements about an axis parallel to the elevation direction.

In illustrative embodiments, the main support is attached (directly) to the first-side wire portion at the first-side main edge, and the main support is attached to the second-side wire portion at the second-side main edge.

In illustrative embodiments, the movement of the main support and of the ancillary support relative to the frame (of the backrest), in particular the rotational movements about an axis parallel to the elevation direction, will still more effectively be controlled.

In illustrative embodiments, the structural core comprises a lower-wire portion extending in the transverse direction to the lower structural end between the first-side wire portion and the second-side wire portion, so that the first-side wire portion, the lower wire portion and the second-side wire portion form three successive parts of a single wire.

In illustrative embodiments, the number of members constituting the suspension system is reduced.

In illustrative embodiments, the wire is preferably made of steel.

In illustrative embodiments, the wire may have high properties of strength and elasticity.

In various embodiments of the suspension system according to the present disclosure, any and/or all the following arrangements may also be employed:
- the main support further comprises main elastic engagement members wherein the structural core is held;
- the ancillary support further comprises ancillary elastic engagement members wherein the structural core is held;
- the main support and the ancillary support are made of plastic material;
- the assembly further comprises a secondary support, the secondary support has a secondary plate (adjacent to and) extending along the extension of the main plate along the elevation direction, the main support is arranged between the ancillary support and the secondary support in the elevation direction, and the secondary support is attached to the structural core at the lower structural end;
- the main plate extends along the elevation direction between a main upper edge and a main lower edge, the central portion extends along the elevation direction between a central upper edge and a central lower edge, and the central lower edge extends opposite the main upper edge;
- the ancillary plate further has a first side lateral portion, and the first side lateral portion extends in the transverse direction from the central portion to a first side outer edge, located beyond the first side main edge;
- the first-side lateral portion extends in the elevation direction to a first-side lower edge (the central lower edge being located between the upper central edge and the first-side lower edge along the elevation direction), and the first-side lateral portion has a first-side inner edge extending opposite the first-side main edge;
- the suspension system has a plane of symmetry extending perpendicular to the transverse direction;
- the structural core has an upper attachment portion, a lower attachment portion and a holding portion, the upper attachment portion is arranged at the upper structural end and intended to be attached to the frame (of the backrest), the lower attachment portion is arranged at the lower structural end and intended to be attached to the frame (of the backrest), the holding portion extends along the elevation direction between the upper attachment portion and the lower attachment portion, and the main support is attached (directly) to the holding portion;

the upper portion is curved between 120 degrees and 180 degrees around the transverse direction, in order to form a hook for suspending the structural core on the frame (of the backrest);

the upper structural end is received in a bore of the ancillary support extending over at least 3 centimeters;

the lower portion is curved around the transverse direction between 80 degrees and 100 degrees, in order to allow the structural core to be elastically held on the frame (of the backrest).

The present disclosure further relates to a seat backrest comprising the above-mentioned suspension system and the frame (of the backrest), wherein the suspension system is held on the frame (of the backrest) by the structural core.

Preferably, the backrest further comprises a padding and a cover, and the padding is arranged between the cover and the main support and the ancillary support.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 schematically shows a side view of a first vehicle seat comprising a first backrest;

DETAILED DESCRIPTION

In the various figures, the same references designate identical or similar elements. For simplicity's sake, only the elements that are useful for understanding the described embodiment are shown in the figures and are described in detail below.

In the following description, when referring to terms qualifying absolute position, such as the terms "front", "rear", "top", "bottom", "left", "right", etc., or relative ones, such as the terms "above", "below", "upper", "lower", etc., or to qualifiers of orientation, such as "horizontal", "vertical", etc., reference is made, unless otherwise specified, to the orientation of the figures or a vehicle seat in its normal position of use.

Figure 1:
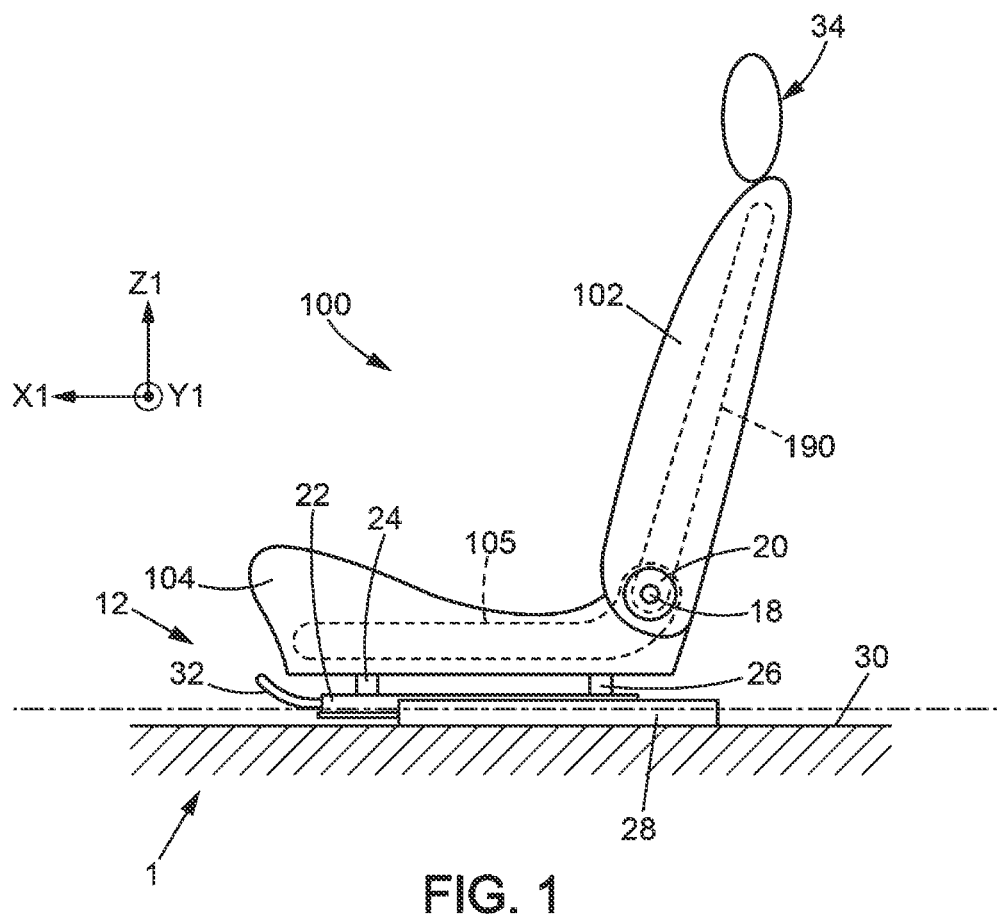
Figure 2:
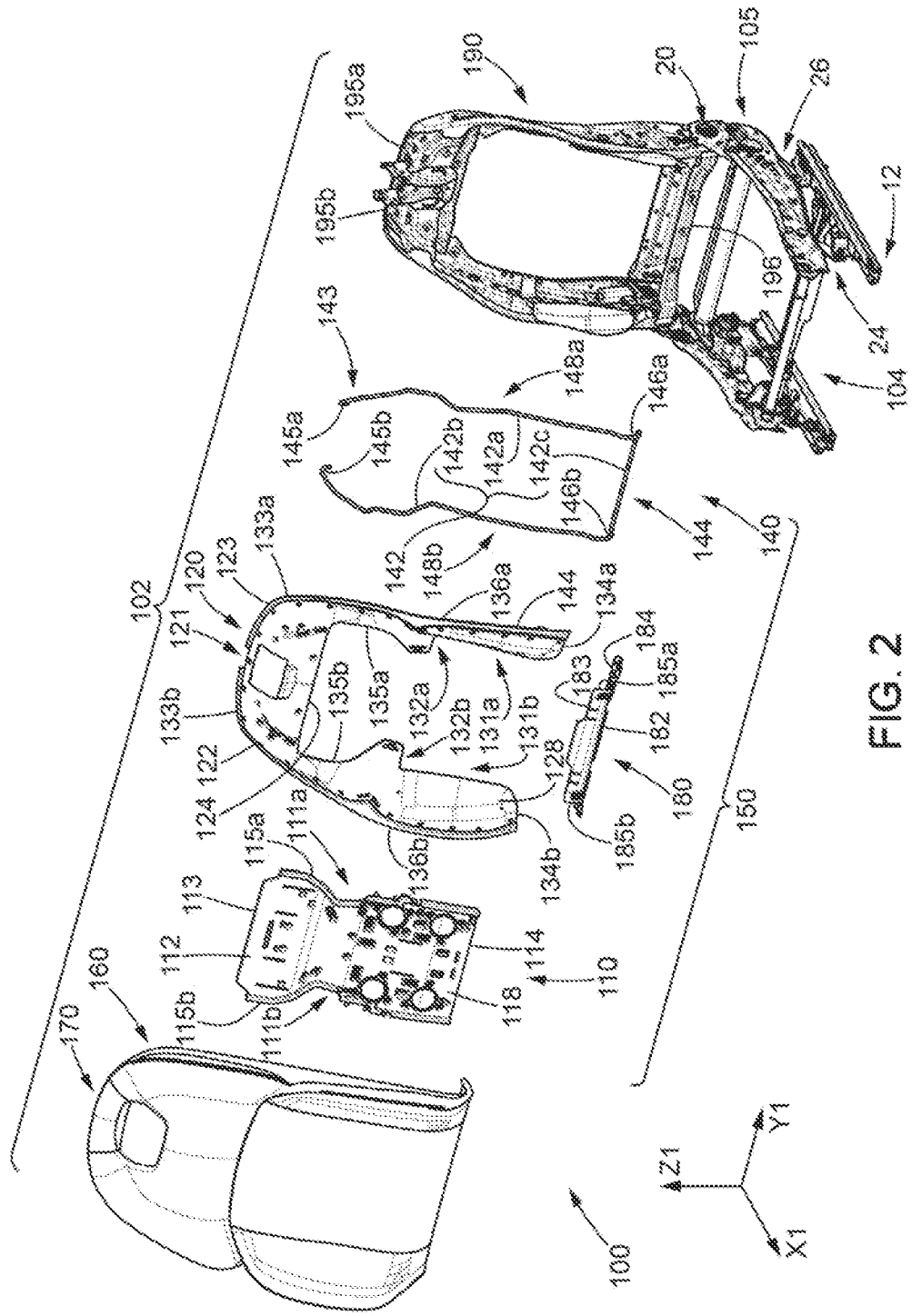
FIG. 2 shows an exploded perspective view of the first seat comprising the first backrest, the first backrest comprising a first suspension system.
Figure 3:
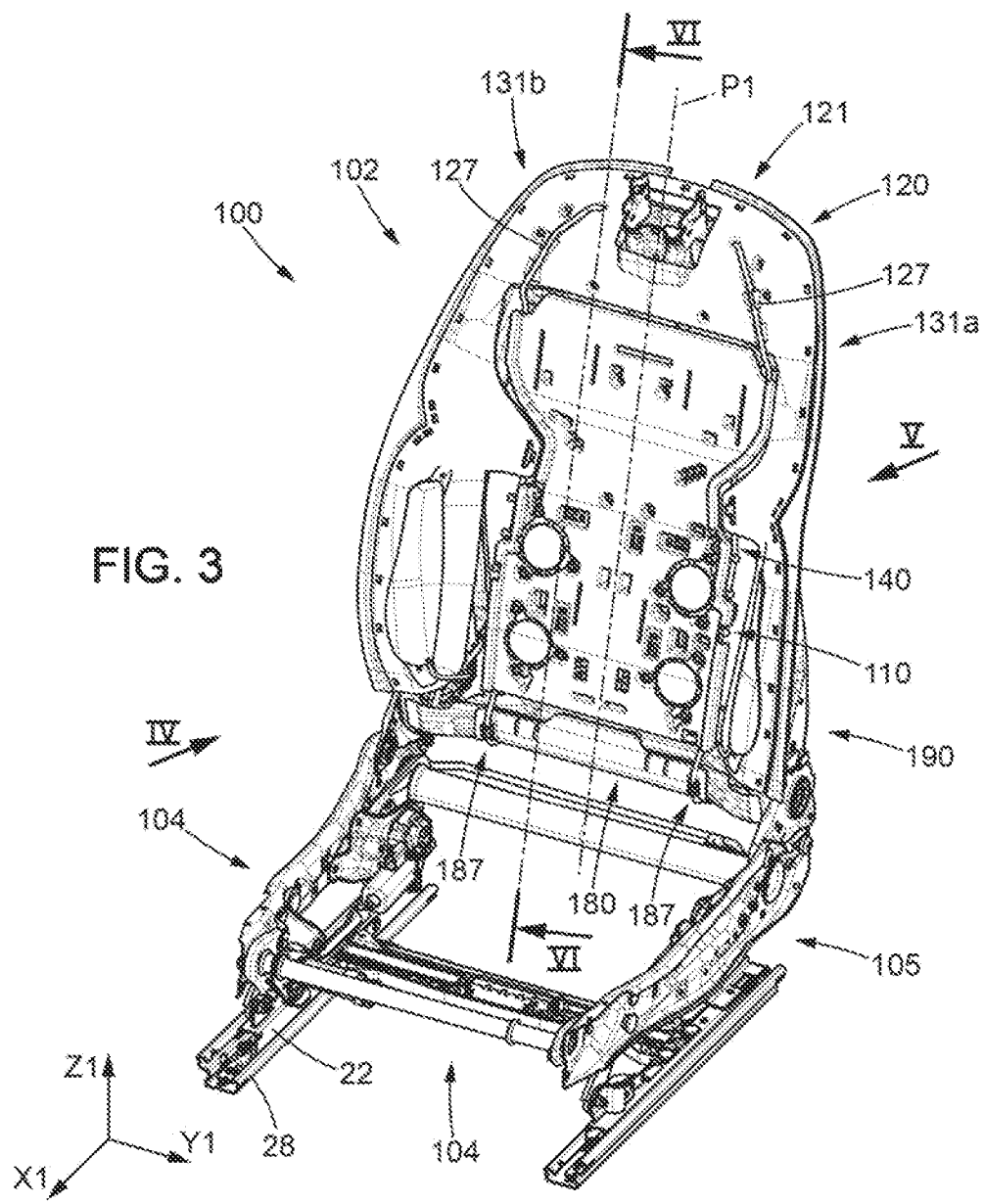
FIG. 3 shows in perspective the first vehicle seat.

FIG. 1 schematically shows a first seat 100 mounted in a motor vehicle 1.

A first longitudinal direction X1 is understood to mean the longitudinal direction of the first seat 100. The longitudinal direction of the seat is considered to be the same as the longitudinal direction of the motor vehicle 1 wherein the seat 100 is mounted. The first longitudinal direction X1 corresponds to the normal direction of travel of the vehicle. The first longitudinal direction X1 is substantially horizontal. The first transverse direction Y1 is understood to mean the transverse direction of the first seat 100 and thus corresponds to the transverse or lateral direction of the motor vehicle. This first transverse direction Y1 corresponds to a direction perpendicular to the first longitudinal direction X1. The first transverse direction Y1 is substantially horizontal. Finally, a first elevation direction Z1 is a substantially vertical direction of the seat, perpendicular to the first longitudinal direction X1 and to the first transverse direction Y1. The first elevation direction Z1 corresponds to a vertical direction of the vehicle.

The first motor vehicle seat 100 is mounted on a slide mechanism 12. The first seat 100 comprises a first seat 104 and a first backrest 102. The first seat 104 comprises a first seat frame 105. The first backrest 102 comprises a first frame 190. The first frame 190 is mounted on the first seat frame 105, pivotably around an axis 18, extending along the first transverse direction Y1, in the embodiment shown. To do this, a hinge mechanism 20 is arranged between the first seat frame 105 and the first frame 190.

The first seat frame 105 is mounted on movable profiles 22, also called slides or male profiles, via front feet 24 and rear feet 26. The slide mechanism 12 comprises the movable profiles 22 and fixed profiles 28. Each movable profile 22 cooperates with one of the fixed profiles 28 within one of the two slides of the slide mechanism 12. Each fixed profile 28 is attached to a floorboard 30 of the motor vehicle 1.

The first seat 100 comprises, in the embodiment shown, a manual control member 32, called a handle, configured to control the sliding locking/unlocking of the slide mechanism 12. The manual control member 32 makes it possible in particular to lock and unlock stop systems for stopping the sliding of the movable profiles 22 relative to the respective fixed profiles 28. Once the stop systems have been unlocked, the manual control member 32 can also be used to cause the movable profiles 22 to slide relative to their respective fixed profiles 28, in other words the first seat 100 relative to the floorboard 30, along the first longitudinal direction X1. The fixed profiles 28 and movable profiles 22 are generally metallic.

Alternatively, the translation of the movable profiles 22 along the first longitudinal direction X1 relative to the fixed profiles 28, in other words the movement of the first seat 100 relative to the floorboard 30, can be controlled by an actuator.

In the embodiment shown, the first seat 102 may also comprise a headrest 34, the headrest 34 comprising a headrest frame provided with rods mounted slidably along the first elevation direction Z1 on the first frame 190 of the first backrest 102.

In the following, the first backrest 102 of the first seat 100 is described in greater detail.

As shown in particular in FIGS. 2 to 6, the first backrest 102 comprises the first frame 190, a first suspension system 150, a first padding 160 and a first cover 170.

The first suspension system 150 comprises a first main support 110, a first ancillary support 120, a first secondary support 180 and a first structural core 140.

The first main support 110 is formed in one piece and comprises a first main plate 112 and first main elastic engagement members 117 (or first main clips). The first main elastic engagement members 117 are obtained from material (during the same molding operation) with the first main plate 112. The first main plate 112 has a first main front face 118 and a first main rear face 119. The first main plate 112 is substantially planar, of constant thickness and extends substantially perpendicular to the first longitudinal direction X1. The first main plate 112 extends along the first elevation direction Z1 between a first main upper edge 113 and a first main lower edge 114. The first main plate 112 extends along the first transverse direction Y1 between a first-side first main edge 115a and a second-side first main edge 115b. The first main upper edge 113 and the first main lower edge 114 extend substantially along the first transverse direction Y1. The first-side first main edge 115a and the second-side first main edge 115b extend substantially along the first elevation direction Z1. The first main plate 112 is therefore substantially rectangular.

The first ancillary support 120 is formed from a single piece and distinct from the first main support 110. The first ancillary support 120 comprises a first ancillary plate 122, first central elastic engagement members 127 (or first ancillary clips) and first lateral elastic engagement members 137 (or first lateral clips). The first central elastic engagement members 127 and the first lateral elastic engagement members 137 are obtained from material (during the same molding operation) with the first ancillary plate 122. The first ancillary plate 122 has a first front ancillary face 128 and a first rear ancillary face 129. The first ancillary plate 122 has a first central portion 121, a first-side first lateral portion 131a and a second-side first lateral portion 131b. The first central portion extends along the first elevation direction Z1 between a first upper central edge 123 and a first central lower edge 124. The first central portion 121 extends along the first transverse direction Y1 between a first-side first boundary 130a and a second-side first boundary 130b. The first upper central edge 123 and the first central lower edge 124 extend substantially along the first transverse direction Y1.

The first central portion 121 is adjacent to the first main plate 112. The first central lower edge 124 is opposite the first main upper edge 113. The first central portion 121 extends in the extension of the first main plate 112. The first-side first boundary 130a extends in the extension of the first-side first main edge 115a in the first elevation direction Z1 and the second-side first boundary 130b extends in the extension of the second-side first main edge 115b along the elevation direction Z1. The first central portion 121 is substantially rectangular.

The first-side first lateral portion 131a extends along the first lateral direction Y1 from the first-side first boundary 130a to a first-side first outer edge 136a located beyond the first-side first main edge 115a. The first-side first lateral portion 131a extends along the first elevation direction Z1 from a first-side first upper edge 133a to a first-side first lower edge 134a. The first-side first upper edge 133a extends along the first transverse direction Y1 in the extension of the first upper central edge 113. The first central lower edge 124 is located between the first upper central edge 123 and the first-side first lower edge 134a, in other words the first-side first lateral portion 131a descends lower than the first central portion 121. Furthermore, in the first elevation direction Z1, the first main upper edge 113 is located between the first central lower edge 124 and the first-side first lower edge 134a, in other words the first-side first lateral portion 131a has a first-side first inner edge 135a extending opposite the first-side first main edge 115a. Preferably, the spacing between the first-side first inner edge 135a and the first-side first main edge 115a is between 5 millimeters and 5 centimeters. In the embodiment shown, the first-side first lower edge 134a is substantially at the same level along the first elevation direction Z1 as the first main lower edge 114. In other words, the first-side first inner edge 135a extends opposite the first-side first main edge 115a all along the first-side first main edge 115a.

The first suspension system 150 has a first plane of symmetry P1 extending perpendicular to the first transverse direction Y1. In particular, the first main support 110, the first ancillary support 120 and the first structural core 140 are symmetrical relative to the first plane of symmetry P1.

The second-side first lateral portion 131b extends in the first lateral direction Y1 from the second-side first boundary 130b to a second-side first outer edge 136b located beyond the second-side first main edge 115b. The second-side first lateral portion 131b extends along the first elevation direction Z1 from a second-side first upper edge 133b to a second-side first lower edge 134b. The second-side first upper edge 133b extends along the first transverse direction Y1 in the extension of the first upper central edge 113. The first central lower edge 124 is located between the first upper central edge 123 and the second-side first lower edge 134b, in other words the second-side first lateral portion 131b descends lower than the first central portion 121. Furthermore, in the first elevation direction Z1, the first main upper edge 113 is located between the first central lower edge 124 and the second-side first lower edge 134b, in other words the second-side first lateral portion 131b has a second-side first inner second edge 135b extending opposite the second-side first main edge 115b. Preferably, the spacing between the second-side first inner edge 135b and the second-side first main edge 115b is between 5 millimeters and 5 centimeters. In the embodiment shown, the second-side first lower edge 134a is substantially at the same level along the first elevation direction Z1 as the first main lower edge 114. In other words, the second-side first inner edge 135b extends opposite the second-side first main edge 115b all along the second-side first main edge 115b.

The first ancillary support 120 extends along the first elevation direction Z1 over a first height H1 between the first upper central edge 123 and a first lower ancillary edge defined by the first-side first lower edge 134a and the second-side first lower edge 134b.

Figure 4:
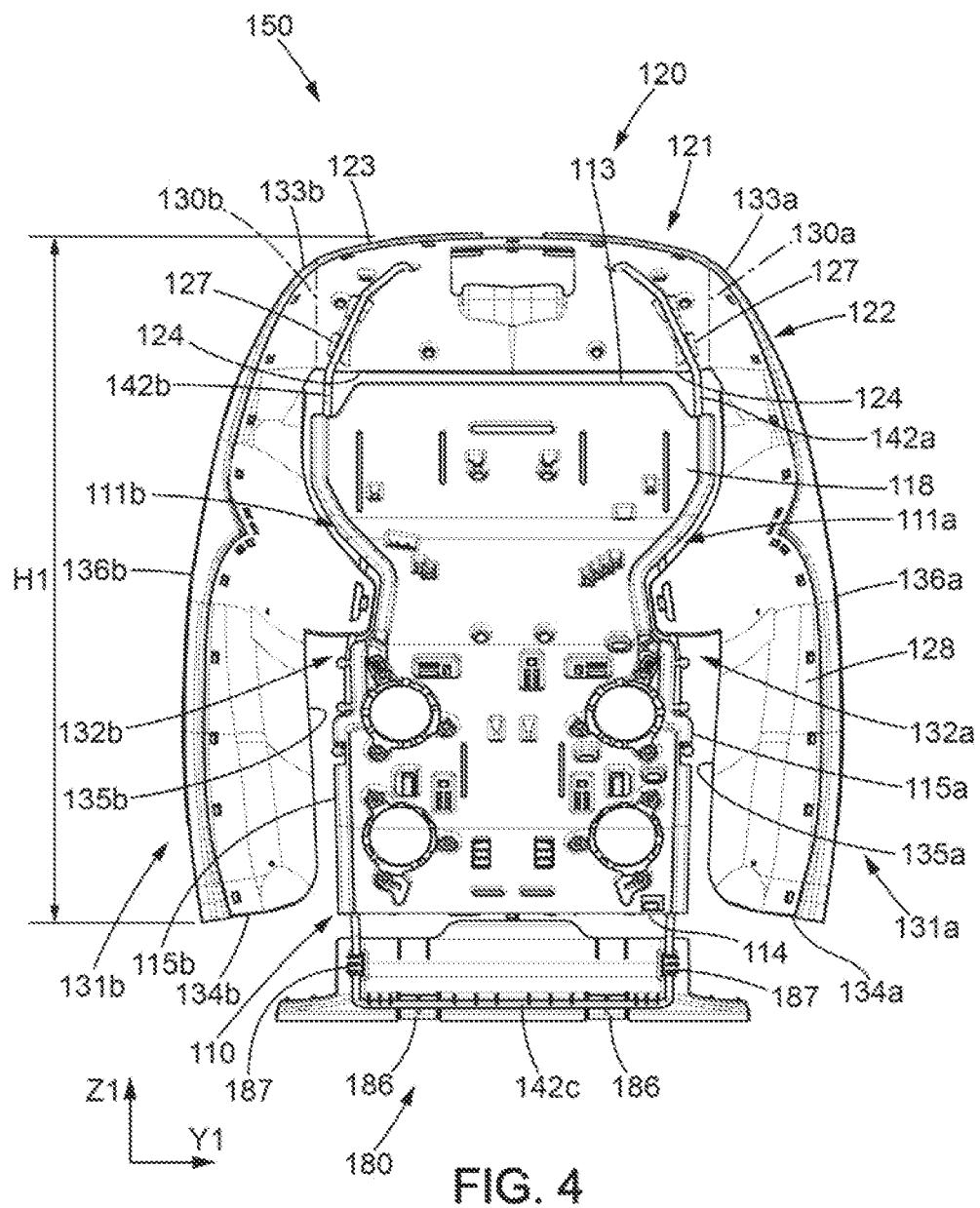
FIG. 4 shows the first suspension system in front view, along the arrow referenced IV in FIG. 3.
Figure 5:
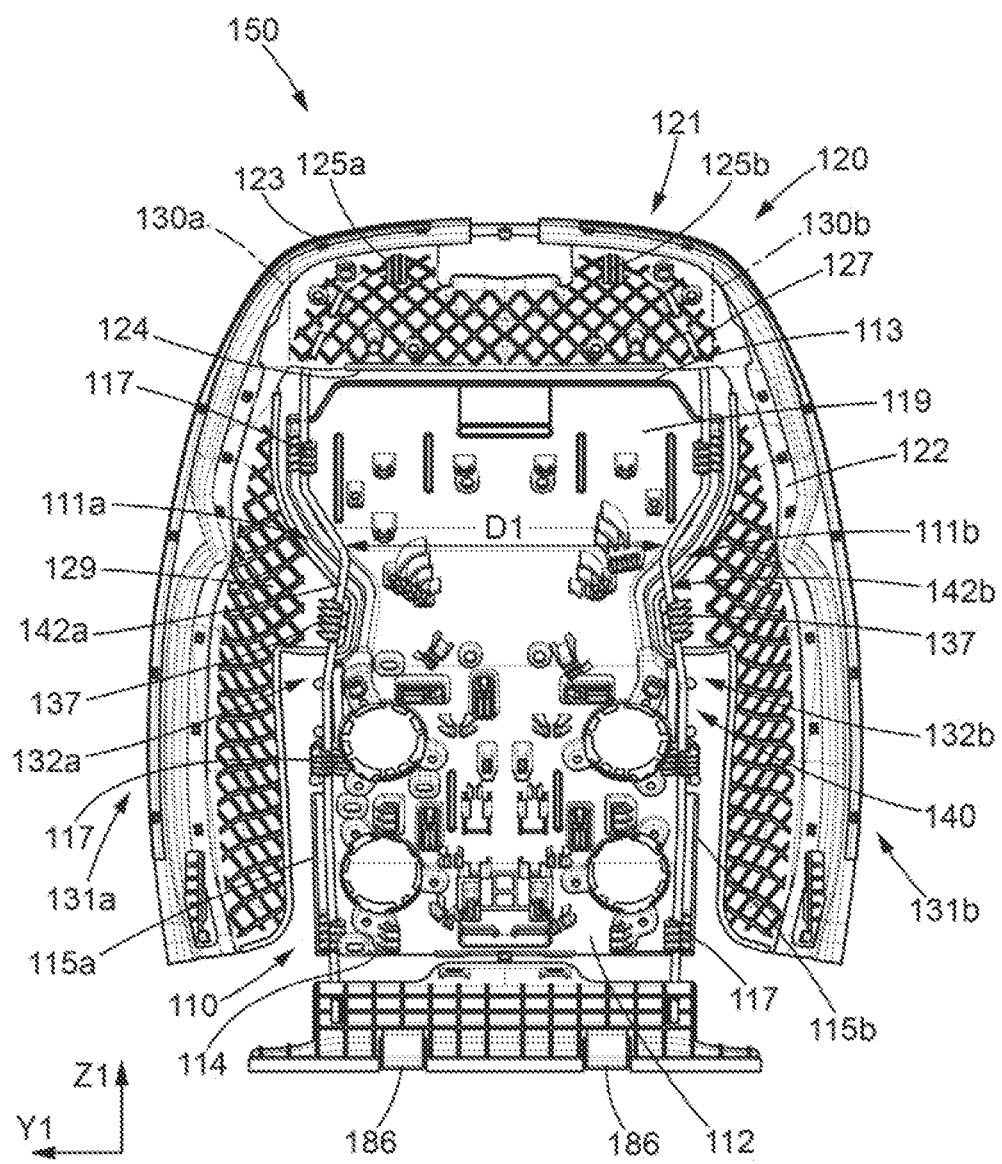
FIG. 5 shows the first suspension system in rear view, along the arrow marked V in FIG. 3.

As shown in particular in FIGS. 4 and 5, the first main elastic engagement members 117 are arranged on the first main rear face 119 along the first-side first main edge 115a and the second-side first main edge 115b. The first central elastic engagement members 127 are arranged on the first front ancillary face 128, in the first central portion 121, near the first-side first boundary 130a and the second-side first boundary 130b. The first lateral elastic engagement members 137 are arranged on the first rear ancillary face 129.

The first main plate 112 has a first-side first recess 111a, the first-side first edge 115a forming a hollow along the first transverse direction Y1 and a second-side first recess 111b, the second-side first edge 115b forming a hollow in the first transverse direction Y1. The first-side first lateral portion 131a has a first-side first flange 132a protruding toward the first main plate 112 along the first transverse direction Y1 and inserted into the first-side first recess 111a. The first-side first flange 132a carries one of the first lateral elastic engagement members 137. The second-side first lateral portion 131b has a second-side first flange 132b protruding toward the first main plate 112 along the first transverse direction Y1 and inserted into the second-side first recess 111b. The second-side first lateral portion 131b carries one of the first lateral elastic engagement members 137.

The first main support 110, the first ancillary support 120 and the first secondary support 180 are preferably made of plastic material.

The first structural core 140 extends along the first elevation direction Z1 between a first upper structural end 143 and a first lower structural end 144. The first structural core 140 is attached to the first frame 190 at the first upper structural end 143 and at the first lower structural end 144.

In the illustrated embodiment, the first structural core 140 more precisely comprises a first wire 142. The first wire 142 comprises a first-side first wire portion 142a, a second-side first wire portion 142b and a first lower wire portion 142c. The first-side first wire portion 142a and the second-side first wire portion 142b extend substantially along the first elevation direction Z1. The first lower wire portion 142c extends substantially along the first transverse direction Y1. The first lower wire portion 142c extends to the first lower structural end 144. The first lower wire portion 142c extends between the first-side first wire portion 142a and the second-side first wire portion 142b, so that the first-side first wire portion 142a, the first lower wire portion 142c and the second-side first wire portion 142b form three successive parts of the single first wire 142 constituting the first structural core 140.

The first-side first wire portion 142a has a first-side first upper attachment portion 145a. The first-side first upper attachment portion 145a is curved around the first transverse direction Y1, the first-side first upper attachment portion 145a thus forming a hook. As shown in particular in FIG. 5, the first central portion 121 comprises a first-side first bore 125a having a length L greater than or equal to 3 centimeters and projecting relative to the first main rear face 119. At the first upper structural end 143, the first-side first upper attachment portion 145a is rectilinear and received in the first-side first bore 125a.

The second-side first wire portion 142b has a second-side first upper attachment portion 145b. The second-side first upper attachment portion 145b is curved around the first transverse direction Y1, the second-side first upper attachment portion 145a thus forming a hook. As shown in particular in FIG. 5, the first central portion 121 has a second-side first bore 125b projecting over at least 3 centimeters relative to the first main rear face 119. At the first upper structural end 143, the second-side first upper attachment portion 145a is rectilinear and received in the second-side first bore 125b.

The first-side first upper attachment portion 145a and the second-side first upper attachment portion 145b are curved around the first transverse direction Y1 between 120 degrees and 180 degrees, preferably over about 150 degrees.

The first upper structural end 143 of the first-side first upper attachment portion 145a and the first-side first bore 125a closely surrounding the first upper structural end 143 of the first-side first upper attachment portion 145a are received in a first-side attachment hole 195a of the first frame 190. The first upper structural end 143 of the second-side first upper attachment portion 145b and the second-side first bore 125b closely surrounding the first upper structural end 143 of the second-side first upper attachment portion 145b are received in a second-side first attachment hole 195b of the first frame 190.

The first-side first wire portion 142a has a first-side first lower attachment portion 146a. The first-side first lower attachment portion 146a is curved around the first transverse direction Y1 at the first lower structural end 144 between 80 degrees and 100 degrees, in the same direction as the first-side first upper attachment portion 145a and the second-side first upper attachment portion 145b. The second-side first wire portion 142b has a second-side first lower attachment portion 146b. The second-side first lower attachment portion 146b is curved around the first transverse direction Y1 at the first lower structural end 144 between 80 degrees and 100 degrees, in the same direction as the first-side first lower attachment portion 146a.

The first-side first wire portion 142a has a first-side first holding portion 148a between the first-side first upper attachment portion 145a and the first-side first lower attachment portion 146a. The second-side first wire portion 142b has a second-side first holding portion 148b between the second-side first upper attachment portion 145b and the second-side first lower attachment portion 146b.

The first main support 110 is attached directly to the first-side first holding portion 148a by the first main elastic engagement members 117 arranged along the first-side first main edge 115a and on the second-side first main holding portion 148b by the first main elastic engagement members 117 arranged along the second-side first main edge 115b.

The first ancillary support 120 is attached directly to the first structural core 140. More specifically, the first central portion 121 is attached to the first-side first main holding portion 148a via first central elastic engagement members 127 arranged near the first-side first boundary 130a and on the second-side first holding portion 148b via first central elastic engagement members 127 arranged near the second-side first boundary 130b. The first-side first lateral portion 131a is attached to the first-side first holding portion 148a via one of the first elastic engagement members 137. The second-side first lateral portion 131b is attached to the second-side first holding portion 148b via one of the first lateral elastic engagement members 137.

The first-side first wire portion 142a, in particular the first-side first holding portion 148a, is separated along the first transverse direction Y1 by a first distance D1, preferably between 20 centimeters and 50 centimeters, relative to the second-side first wire portion 142b, in particular relative to the second-side first holding portion 148b.

The first wire 142 has a cross section preferably comprised between 10 square millimeters and 100 square millimeters. The first wire 142 is preferably made of steel, sometimes referred to as spring steel.

The first secondary support 180 comprises a first secondary plate 182 and first secondary elastic engagement members 187 (or first secondary clips). The first secondary elastic engagement members 187 are obtained from material (during the same molding operation) with the first secondary plate 182. The first secondary plate 182 has a first secondary front face 188 and a first secondary rear face 189.

The first secondary plate 182 is of constant and curved thickness. The first secondary plate 182 extends along the first elevation direction Z1 and the first longitudinal direction X1 between a first secondary upper edge 183 and a first secondary rear edge 184. The first secondary plate 182 extends along the first transverse direction Y1 between a first-side first secondary edge 185a and a second-side first secondary edge 185b. The first secondary upper edge 183 and the first secondary rear edge 184 extend substantially along the first transverse direction Y1. The first-side first secondary edge 185a and the second-side first secondary edge 185b extend from the first secondary upper edge 183 to the first secondary rear edge 184 along the first elevation direction Z1, then gradually in the first longitudinal direction X1 and further away from one another in the first transverse direction Y1.

The first secondary upper edge 183 is opposite the first main lower edge 114. The first secondary plate 182 extends in the extension of the first main plate 112, the first main plate 110 being arranged between the first secondary plate 182 and the first ancillary plate 122 along the first elevation direction Z1.

The first secondary plate 182 is curved in order to conform to the shape of the first structural core 140 near the first lower structural end 144. In particular, the first secondary plate 182 is in contact with the first-side first lower attachment portion 146a and the second-side first lower attachment portion 146b.

The first secondary elastic engagement members 187 are arranged on the first rear secondary face 189. The first secondary support 180 is attached directly to the first-side first lower attachment portion 148a and to the second-side first lower attachment portion 148b by the first secondary elastic engagement members 187. Alternatively or in addition to the first secondary elastic engagement members 187 shown, the first secondary support 180 could be attached to the first lower wire portion 142c by similar elastic engagement members.

Figure 6:
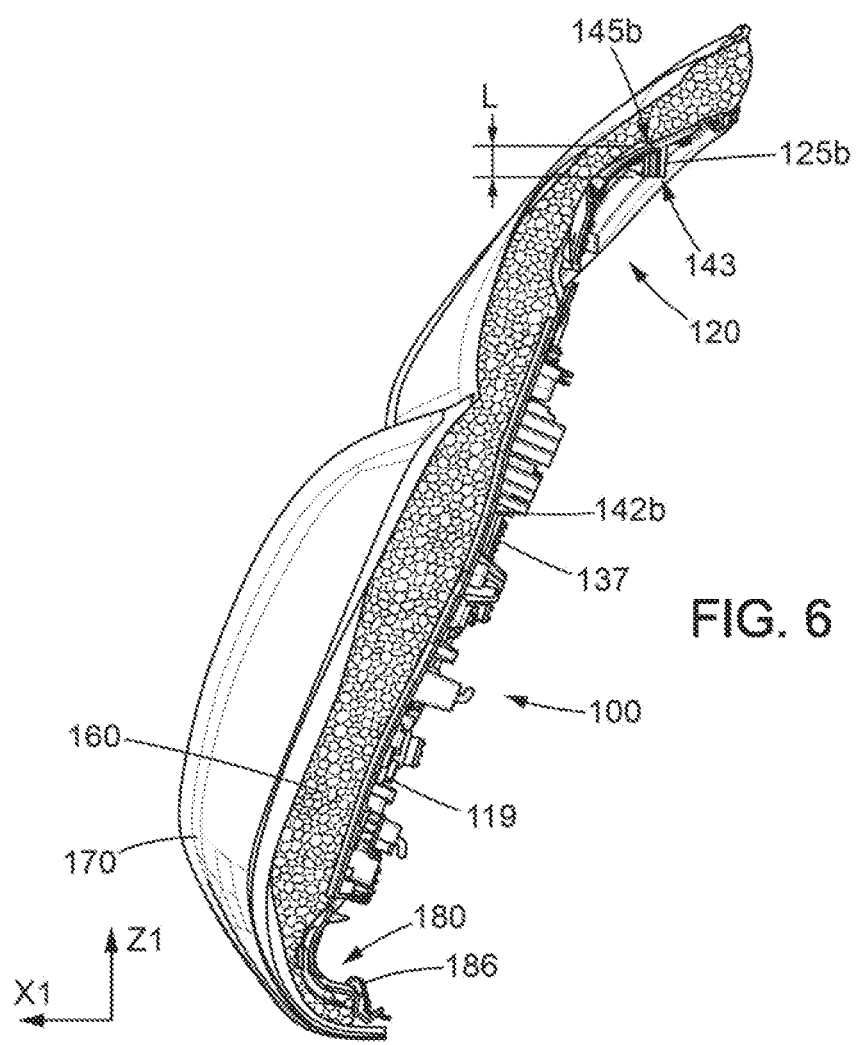
FIG. 6 shows the first backrest in cross-section along the line referenced VI-VI in FIG. 3.

As shown in particular in FIGS. 5 and 6, the first secondary support 180 further incorporates first elastic attachment tabs 186 projecting onto the first rear secondary face 189 and cooperating with the first lower cross member 196 in order to releasably attach the first structural core 140 to the first frame 190.

To produce the first backrest 102, the first main support 110, the first ancillary support 120, the first structural core 140 and the first secondary support 180 are produced. Then, the first suspension system 150 is produced by attaching the first main support 110, the first ancillary support 120 and the first secondary support 180 onto the first structural core 140. The first suspension system 150 then forms a first module, all of the members of which are held relative to one another. The first suspension system 150 can then be easily transported to a place where the first frame 190 is manufactured.

The first structural core 140 and more generally the first suspension system is then suspended onto the first frame 190 (by inserting the first upper structural end 143 into the first-side first attachment hole 195a and the second-side first attachment hole 195b). Then, the first lower structural end 144 is engaged under the first lower crossmember 196 of the first frame 190. The first elastic attachment tabs 186 deform, then elastically return to form a stop attaching the first lower structural end 144 to the first frame 190.

The first padding 180 is then arranged on the first main front face 118, the first front ancillary face 128 and the first front secondary face 188. The first padding 180 is then covered with the first cover 170 and the first cover 170 is held on the first frame 190 by any suitable techniques, which hold the first padding 180 between the first cover 170 and the first suspension system 150.

As a variant, the first padding could be made in a single part by foaming onto the first suspension system or alternatively in several foamed parts respectively on the first main support 110, the first ancillary support 120 and the first secondary support 180.

Figure 7:
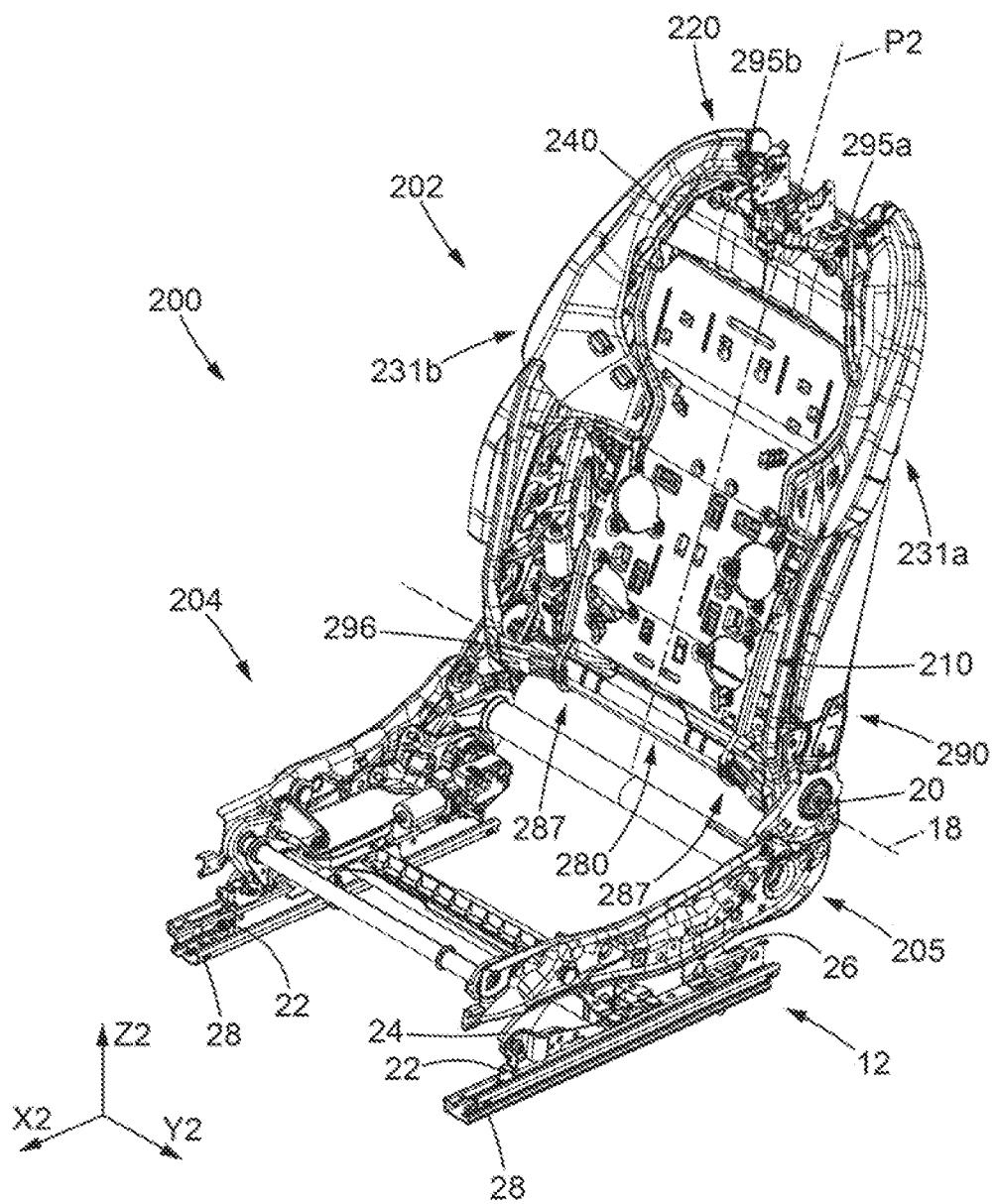
FIG. 7 shows a second seat comprising a second backrest, in perspective according to FIG. 3, the second backrest comprising a second suspension system.
Figure 8:
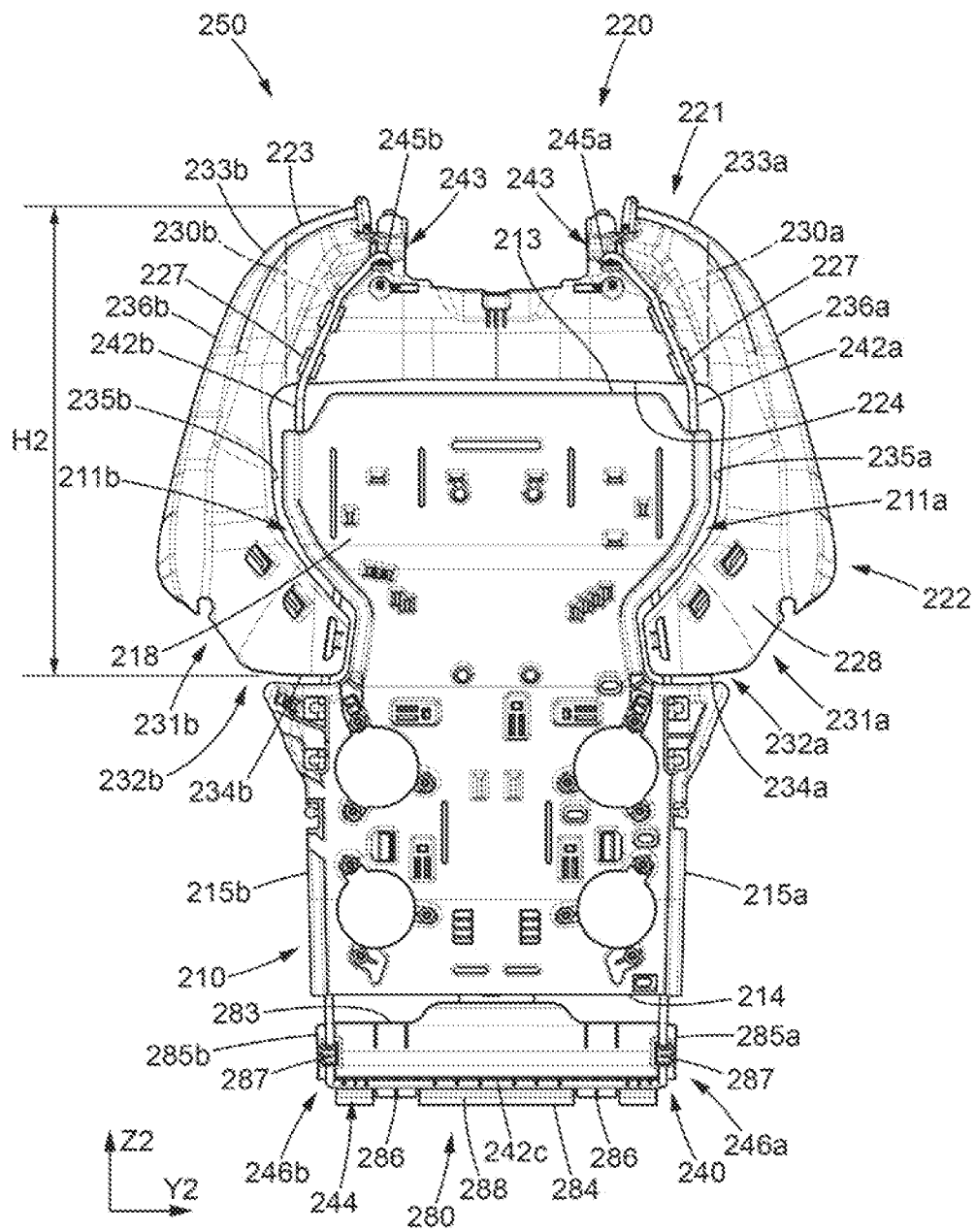
FIG. 8 shows the second suspension system in front view.
Figure 9:
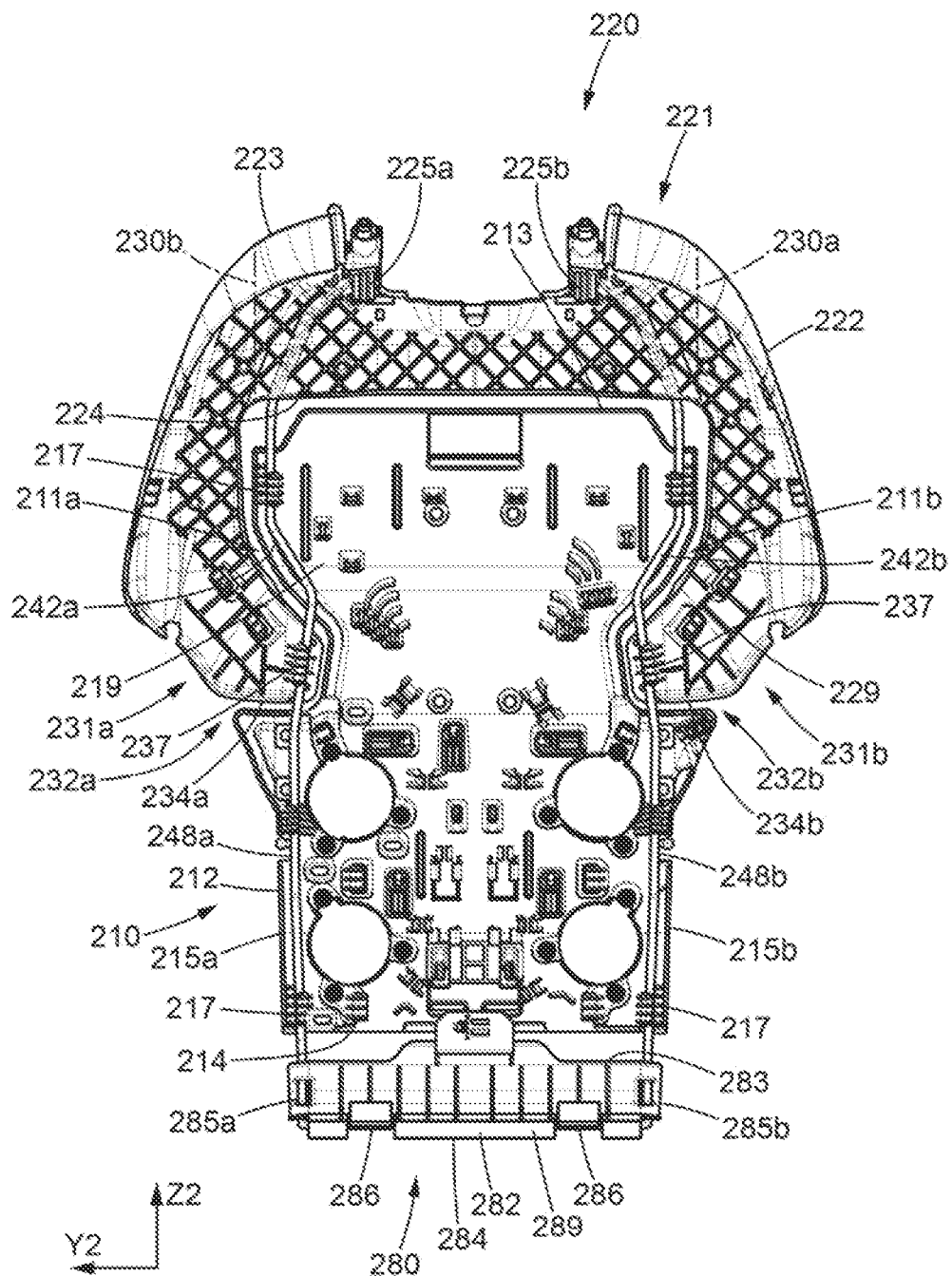
FIG. 9 shows the second suspension system in a rear view.

FIGS. 7 to 9 show a second seat 200 intended to be mounted in a motor vehicle.

The second motor vehicle seat 200 is mounted on a slide mechanism 12. The second seat 200 comprises a second seat 204 and a second backrest 202. The second seat 204 comprises a second seat frame 205. The second backrest 202 comprises a second frame 290. The second frame 290 is mounted on the second seat frame 205, pivotably around an axis 18, extending, in the embodiment shown, along a second transverse direction Y2 perpendicular to the second longitudinal direction X2 and to the second elevation direction Z2. To do this, a hinge mechanism 20 is arranged between the second seat frame 205 and the second frame 290.

The second seat frame 205 is mounted on movable profiles 22, also called slides or male profiles, via front feet 24 and rear feet 26. The slide mechanism 12 comprises the movable profiles 22 and fixed profiles 28. Each movable profile 22 cooperates with one of the fixed profiles 28 within one of the two slides of the slide mechanism 12. Each fixed profile 28 is intended to be attached to a floorboard of the motor vehicle.

The second seat 200 comprises, in the embodiment shown, a manual control member (not shown), called a handle, configured to control the sliding locking/unlocking mechanism 12. The manual control member makes it possible in particular to lock and unlock stop systems for stopping the sliding of the movable profiles 22 relative to the respective fixed profiles 28. Once the stop systems have been unlocked, the manual control member can also be used to cause the movable profiles 22 to slide relative to their respective fixed profiles 28, in other words the second seat 200 relative to the floorboard, along a second longitudinal direction X2. The fixed profiles 28 and movable profiles 22 are generally metallic.

Alternatively, the translation of the movable profiles 22 along the second longitudinal direction X2 relative to the fixed profiles 28, in other words the movement of the second seat 200 relative to the floorboard 30 can be controlled by an actuator.

In the embodiment shown, the second seat 202 may also comprise a headrest, the headrest comprising a headrest frame provided with rods slidably mounted on the second frame 290, along a second elevation direction Z2 perpendicular to the second longitudinal direction X2.

The second backrest 202 of the second seat 200 is described in greater detail hereinafter.

As shown in particular in FIGS. 7 to 9, the second backrest 202 comprises the second frame 290, a second suspension system 250, a second padding and a second cover (not shown).

The second suspension system 250 comprises a second main support 210, a second ancillary support 220, a second secondary support 280 and a second structural core 240.

The second main support 210 is formed from a single piece and comprises a second main plate 212 and second main elastic engagement members 217 (or second main clips). The second main elastic engagement members 217 are made of material (during the same molding operation) with the second main plate 222. The second main plate 212 has a second main front face 218 and a second main rear face 219. The second main plate 212 is substantially planar, of constant thickness and extends substantially perpendicular to the second longitudinal direction X2. The second main plate 212 extends along the second elevation direction Z2 between a second main upper edge 213 and a second main lower edge 214. The second main plate 212 extends along the second transverse direction Y2 between a first-side second main edge 215a and a second-side second main edge 215b. The second main upper edge 213 and the second main lower edge 214 extend substantially along the second transverse direction Y2. The first-side second main edge 215a and the second-side second main edge 215b extend substantially along the second elevation direction Z2. The second main plate 212 is therefore substantially rectangular.

The second ancillary support 220 is formed from a single piece and distinct from the second main support 210. The second ancillary support 220 comprises a second ancillary plate 222, second central elastic engagement members 227 (or second ancillary clips) and second lateral elastic engagement members 237 (or second lateral clips). The second central elastic engagement members 227 and the second lateral elastic engagement members 137 are obtained from material (during the same molding operation) with the second ancillary plate 222. The second ancillary plate 222 has a second front ancillary face 228 and a second rear ancillary face 229. The second ancillary plate 222 has a second central portion 221, a first-side second lateral portion 231a and a second-side second lateral portion 231b. The second central portion extends along the second elevation direction Z2 between a second central upper edge 223 and a second central lower edge 224. The second central portion 221 extends along the second transverse direction Y2 between a first-side second boundary 230a and a second-side second boundary 230b. The second central upper edge 223 and the second central lower edge 224 extend substantially along the second transverse direction Y2.

The second central portion 221 is adjacent to the second main plate 212. The second central lower edge 224 is opposite the second main upper edge 213. The second central portion 221 extends in the extension of the second main plate 212. The first-side second boundary 230a extends in the extension of the first-side second main edge 215a along the second elevation direction Z2 and the second-side second boundary 230b extends in the extension of the second-side second main edge 215b along the second elevation direction Z2. The second central portion 221 is substantially rectangular.

The first-side second lateral portion 231a extends along the second lateral direction Y2 from the first-side second boundary 230a to a first-side second outer edge 236a located beyond the first-side second main edge 215a. The first-side second lateral portion 231a extends along the second elevation direction Z2 from a first-side second upper edge 233a to a first-side second lower edge 234a. The first-side second upper edge 233a extends along the second transverse direction Y2 in the extension of the second central upper edge 213. The second central lower edge 224 is located between the second central upper edge 223 and the first-side second lower edge 234a, in other words the first-side second lateral portion 231a descends lower than the second central portion 221. Furthermore, in the second elevation direction Z2, the second main upper edge 213 is located between the second central lower edge 224 and the first-side second lower edge 234a, in other words the first-side second lateral portion 231a has a first-side second inner edge 235a extending opposite the first-side second main edge 215a. Preferably, the spacing between the first-side second inner edge 235a and the first-side second main edge 215a is between 5 millimeters and 5 centimeters. In the embodiment shown, the first-side second lower edge 234a is substantially at the same level along the second elevation direction Z2 as the second main lower edge 214. In other words, the first-side second inner edge 235a extends opposite the first-side second main edge 215a all along the first-side second main edge 215a.

The second suspension system 250 has a second plane of symmetry P2 extending perpendicular to the second transverse direction Y2. In particular, the second main support 210, the second ancillary support and the second structural core 240 are symmetrical relative to the second plane of symmetry P2.

The second-side second lateral portion 231b extends along the second lateral direction Y2 from the second-side second boundary 230b to a second-side second outer edge 236b located beyond the second-side second main edge 215b. The second-side second lateral portion 231b extends along the second elevation direction Z2 from a second-side second upper edge 233b to a second-side second lower edge 234b. The second-side second upper edge 233b extends along the second transverse direction Y2 in the extension of the second central upper edge 213. The second central lower edge 224 is located between the second central upper edge 223 and the second-side second lower edge 234b, in other words the second-side second lateral portion 231b descends lower than the second central portion 221. Furthermore, along the second elevation direction Z2, the second main upper edge 213 is located between the second central lower edge 224 and the second-side second lower edge 234b, in other words the second-side second lateral portion 231b has a second-side second inner edge 235b extending opposite the second-side second main edge 215b. Preferably, the spacing between the second-side second inner edge 235b and the second-side second main edge 215b is between 5 millimeters and 5 centimeters. In the embodiment shown, the second-side second lower edge 234a is substantially at the same level along the second elevation direction Z2 as the second main lower edge 214. In other words, the second-side second inner edge 235b extends opposite the second-side second main edge 215b all along the second-side second main edge 215b.

The second ancillary support 220 extends along the second elevation direction Z2 over a second height H2 between the second central upper edge 223 and a second ancillary lower edge defined by the first-side second lower edge 234a and the second-side second lower edge 234b.

As shown in particular in FIGS. 8 and 9, the second main elastic engagement members 217 are arranged on the second main rear face 219 along the first-side second main edge 215a and the second-side second main edge 215b. The second central engagement members 227 are arranged on the second front ancillary face 228, in the second central portion 221, near the first-side second boundary 230a and the second-side second boundary 230b. The second lateral elastic engagement members 237 are arranged on the second rear ancillary face 229.

The second main plate 212 has a first-side second recess 211a, the first-side second edge 215a forming a hollow along the second transverse direction Y2 and a second-side second recess 211b, the second-side second edge 215b forming a hollow along the second transverse direction Y2. The first-side second lateral portion 231a has a first-side second flange 232a protruding toward the second main plate 212 along the second transverse direction Y2 and inserted into the first-side second recess 211a. The first-side second flange 232a carries one of the second lateral elastic engagement members 237. The second-side second lateral portion 231b has a second-side second flange 232b protruding toward the second main plate 212 along the second transverse direction Y2 and being inserted into the second-side second recess 211b. The second-side second lateral portion 231b carries one of the second lateral elastic engagement members 237.

The second main support 210, the second ancillary support 220 and the second secondary support 280 are preferably made of plastic material.

The second structural core 240 extends along the second elevation direction Z2 between a second upper structural end 243 and a second lower structural end 244. The second structural core 240 is attached to the second frame 290 at the second upper structural end 243 and at the lower second structural end 244.

In the embodiment shown, the second structural core 240 more precisely comprises a second wire 242. The second wire 242 comprises a first-side second wire portion 242a, a second-side second wire portion 242b and a second lower-wire portion 242c. The first-side second wire portion 242a and the second-side second wire portion 242b extend substantially along the second elevation direction Z2. The second lower-wire portion 242c extends substantially along the second transverse direction Y2. The second lower-wire portion 242c extends to the lower second structural end 244. The second lower-wire portion 242c extends between the first-side second wire portion 242a and the second-side second wire portion 242b, so that the first-side second wire portion 242a, the second lower-wire portion 242c and the second-side second wire portion 242b form three successive parts of the single second wire 242 constituting the second structural core 240.

The first-side second wire portion 242a has a first-side second upper attachment portion 245a. The first-side second upper attachment portion 245a is curved around the second transverse direction Y2, the first-side second upper attachment portion 245a thus forming a hook. As shown in particular in FIG. 9, the second central portion 221 has a first-side second bore 225a projecting over at least 3 centimeters relative to the second main rear face 219. At the second upper structural end 243, the first-side second upper attachment portion 245a is rectilinear and received in the first-side second bore 225a.

The second-side second wire portion 242b has a second-side second upper attachment portion 245b. The second-side second upper attachment portion 245b is curved around the second transverse direction Y2, the second-side second upper attachment portion 245a thus forming a hook. As shown in particular in FIG. 9, the second central portion 221 has a second-side second bore 225b that projects over at least 3 centimeters relative to the second main rear face 219. At the second upper structural end 243, the second-side second upper attachment portion 245a is rectilinear and received in the second-side second bore 225b.

The first-side second upper attachment portion 245a and the second-side second upper attachment portion 245b are curved around the second transverse direction Y2 between 120 degrees and 180 degrees, preferably over about 150 degrees.

The second upper structural end 243 of the first-side second upper attachment portion 245a and the first-side second bore 225a closely surrounding the second upper structural end 243 of the second-side second upper attachment portion 245a are received in a first-side second attachment hole 295a of the second frame 290. The second upper structural end 243 of the second-side second upper attachment portion 245b and the second-side second bore 225b closely surrounding the second upper structural end 243 of the second-side second upper attachment portion 245b are received in a second-side second attachment hole 295b of the second frame 290.

The first-side second wire portion 242a has a first-side second lower attachment portion 246a. The first-side second lower attachment portion 246a is curved around the second transverse direction Y2 at the second lower structural end 244 between 80 degrees and 100 degrees, in the same direction as the first-side second upper attachment portion 245a and the second-side second upper attachment portion 245b. The second-side wire portion 242b has a second-side second lower attachment portion 246b. The second-side second lower attachment portion 246b is curved around the second transverse direction Y2 at the second lower structural end 244 between 80 degrees and 100 degrees, in the same direction as the first-side second lower attachment portion 246a.

The first-side second wire portion 242a has a first-side second holding portion 248a between the first-side second upper attachment portion 245a and the first-side second lower attachment portion 246a. The second-side second wire portion 242b has a second-side second holding portion 248b between the second-side second upper attachment portion 245b and the second-side second lower attachment portion 246b.

The second main support 210 is attached directly to the first-side second holding portion 248a by the second elastic engagement members 217 arranged along the first-side second main edge 215a and on the second-side second holding portion 248b by the second elastic engagement members 217 arranged along the second-side second main edge 215b.

The second ancillary support 220 is attached directly to the second structural core 240. More specifically, the second central portion 221 is attached to the first-side second holding portion 248a via second elastic engagement members 227 arranged near the first-side second boundary 230a and on the second-side second holding portion 248b via the second central elastic engagement members 227 arranged near the second-side second boundary 230b. The first-side second lateral portion 231a is attached to the first-side second holding portion 248a via one of the second elastic engagement members 237. The second-side second lateral portion 231b is attached to the second-side second holding portion 248b via one of the second elastic engagement members 237.

The first-side second wire portion 242a, in particular the first-side second holding portion 248a, is separated along the second transverse direction Y2 by a second distance D2, preferably between 20 centimeters and 50 centimeters, relative to the second-side second wire portion 242b, in particular relative to the second-side second holding portion 248b.

The second wire 242 has a cross section preferably comprised between 10 square millimeters and 100 square millimeters. The second wire 242 is preferably made of steel, sometimes referred to as spring steel.

The second secondary support 280 comprises a second secondary plate 282 and second secondary elastic engagement members 287 (or second secondary clips). The second secondary elastic engagement members 287 are obtained from material (during the same molding operation) with the second secondary plate 282. The second secondary plate 282 has a second secondary front face 288 and a second secondary rear face 289.

The second secondary plate 282 has a constant and curved thickness. The second secondary plate 282 extends along the second elevation direction Z2 and the second longitudinal direction X2 between a second secondary upper edge 283 and a second secondary rear edge 284. The second secondary plate 282 extends along the second transverse direction Y2 between a first-side second secondary edge 285a and a second-side second secondary edge 285b. The second secondary upper edge 283 and the second secondary rear edge 284 extend substantially along the second transverse direction Y2. The first-side second secondary edge 285a and the second-side second secondary edge 285b extend from the second secondary upper edge 83 to the second secondary rear edge 284 in the second elevation direction Z2, then gradually toward the second longitudinal direction X2.

The second secondary upper edge 283 is opposite the second main lower edge 214. The second secondary plate 282 extends in the extension of the second main plate 212, the second main plate 210 being arranged between the second secondary plate 282 and the second ancillary plate 222 along the second elevation direction Z2.

The second secondary plate 282 is curved, in order to conform to the shape of the second structural core 240 near the second lower structural end 244. In particular, the second secondary plate 282 is in contact with the first-side second lower attachment portion 246a and the second-side second lower attachment portion 246b.

The second secondary elastic engagement members 287 are arranged on the second rear secondary face 289. The second secondary support 280 is attached directly to the first-side second lower attachment portion 248a and to the second-side second lower attachment portion 248b by the second secondary elastic engagement members 287. Alternatively or in addition to the second secondary elastic engagement members 287 that are shown, the second secondary support 280 could be attached to the second lower-wire portion 242c by similar elastic engagement members.

As shown in particular in FIG. 9, the second secondary support 280 further incorporates second elastic attachment tabs 286 protruding on the second secondary rear face 289 and cooperating with the second lower cross member 296 to releasably attach the second structural core 240 to the second frame 290.

In order to produce the second backrest 202, the second main support 210, the second ancillary support 220, the second structural core 240 and the second secondary support 280 are produced. Then, the second suspension system 250 is produced by attaching the second main support 210, the second ancillary support 220 and the second secondary support 280 on the second structural core 240. The second suspension system 250 then forms a second module, all the members of which are held relative to one another. The second suspension system 250 can then easily be transported to a place where the second frame 290 is manufactured.

The second structural core 240 and more generally the second suspension system is then suspended on the second frame 290 (by inserting the second upper structural end 243 into the first-side second attachment hole 295a and the second-side second attachment hole 295b). Then, the second lower structural end 244 is engaged under the second lower crossmember 296 of the second frame 290. The second elastic attachment tabs 286 are deformed, then elastically return to form an abutment attaching the second lower structural end 244 to the second frame 290.

The second padding is then arranged on the second main front face 218, the second ancillary front face 228 and the second secondary front face 288. The second padding is then covered with the second cover and the second cover is held on the second frame 290 by any suitable techniques, which hold the second padding 260 between the second cover 270 and the second suspension system 250.

As a variant, the second padding could be produced in a single part by foaming on the second suspension system or alternatively in several foamed parts respectively on the second main support 210, the second ancillary support 220 and the second secondary support 280.

The second main support 210 is geometrically identical to the first main support 110. In other words, the first main support 110 and the second main support 210 are preferably made in the same mold. Furthermore, the second main support 210 is preferably produced from the same material as the first main support 110, the first main support 110 and the second main support 210 being technically indistinguishable. A marking concerning the date of manufacture or other non-technical difference may however optionally differentiate these parts.

The second structural core 240 is geometrically and/or technically identical to the first structural core 140. Advantageously, the first structural core 140 and the second structural core 240 are undifferentiated.

Although it may appear in the figures that there are a few minor differences in shape between the second secondary support 280 and the first secondary support 180, preferably the second secondary support is geometrically and/or technically identical to the first secondary support 180. Advantageously, the first secondary support 180 and the second secondary support 280 are undifferentiated.

The second frame 290 is geometrically and/or technically identical to the first frame 190. Advantageously, the first frame 190 and the second frame 290 are undifferentiated.

The first-side second lower edge 234a is part of the first-side second flange 231a and is located in the first-side recess 211a. The second-side second lower edge 234b is part of the second-side second flange 231b and is located in the second-side recess 212a. The first-side lower edge 134a and the second-side first lower edge 134b are located substantially at the same level as the first main lower edge 114 along the first elevation direction Z1. Therefore, the second height H2 is less than the first height H1 by between 20 centimeters and 30 centimeters.

Alternatively, a seat could be provided that differs from the second seat in that the first-side second lower edge 234a and the second-side second lower edge 234b would be located approximately at the same level as the second central lower edge 224.

According to another variant, a seat could be provided that differs from the second seat in that the second ancillary plate 222 would have no first-side second lateral portion 231a and second-side second lateral portion 232a, so that the second ancillary plate 222 would be restricted to the second central portion 221.

If necessary, other supports can be provided, for example attached directly to the second frame 290 and contributing to supporting the second padding 260 with the second main support 210 and the second ancillary support 220 or directly equipped with a dedicated padding.

Of course, the disclosure is in no way limited to the embodiments described by way of non-limiting illustration. Thus, if necessary, other comfort functions can be associated with the first main support 110 and the second main support 210, since they have the configurations making it possible to receive members fulfilling these functions. In particular, one or more loudspeakers and/or one or more vibrating devices ("exciters") and/or one or more resistive wires for heating the back of the occupant can be attached to the first main support 110 and the second main support 210. Preferably, the loudspeaker(s) and/or the vibrating device(s) and/or the resistive wire(s) are arranged between on the one hand the first main support 110 or the second main support 210 and the first padding 160 or the second padding.

In the automotive field, a comparative vehicle backrest may comprise a frame, at least one central lining module and two lateral upholstery modules each arranged on a respective side of the central upholstery module, each of the at least three upholstery modules being able to be attached to the frame independently of the other two upholstery modules. Thus, the upholstery of such a comparative backrest can be easily and quickly mounted on the backrest frame. Furthermore, a module can easily be replaced.

With such a comparative backrest, however, it is difficult to connect the upholstery modules to one another in the absence of a backrest without complicating the replacement of a module and/or assembly of the seat. However, since the back frame is generally metallic and the upholstery modules are generally made of plastic or textile, the back frame and the upholstery modules are made according to separate manufacturing techniques. Therefore, the back frame and the upholstery modules are generally produced on remote sites. It may therefore be necessary to transport numerous different members to produce a seat.

To remedy the aforementioned problems, according to the present description, a suspension system is proposed for a vehicle backrest, wherein the suspension system comprises:

- a main support, the main support has a main plate, the main plate extends in a transverse direction between a first-side main edge and a second-side main edge,
- an ancillary support, the ancillary support (is distinct from the main support and) has an ancillary plate, the ancillary plate has a central portion (adjacent to and) extending along the extension of the main plate (it has an edge extending opposite an edge of the main plate) along an elevation direction perpendicular to the transverse direction, and
- a structural core extending along the elevation direction between an upper structural end and a lower structural end, the upper structural end and the lower structural end are intended to be attached to a frame (of a backrest), the main support and the ancillary support are attached to the structural core.

Thus, the structural core performs a suspension function. The suspension system constitutes a module formed by the structural core, the main support and the ancillary support, all the members constituting the module being held together. The production of the backrest is thus facilitated. In particular, in the case where the module is attached to the frame (of the backrest) in a place away from the manufacturing site of the suspension system, the transport of the suspension system is facilitated.

Pursuant to another feature according to the present description, the structural core preferably comprises at least one wire having a cross-section comprised between 10 square millimeters and 100 square millimeters Thus, the structural core allows a robust holding of the main support and of the ancillary support, in order to connect them to the frame (of the backrest), while allowing a deflection of movement to comfortably accommodate the back of a user.

Pursuant to a complementary feature in accordance with the present description, preferably the structural core comprises a first-side wire portion and a second-side wire portion, the first-side wire portion and the second-side wire portion are separated from one another along the transverse direction by a distance of at least 20 centimeters, and the main support is attached to the first-side wire portion and to the second-side wire portion.

Thus, the movement of the main support and of the ancillary support relative to the frame (of the backrest) will be effectively controlled, in particular the rotational movements about an axis parallel to the elevation direction.

Pursuant to a complementary feature in accordance with the present description, preferably the main support is attached (directly) to the first-side wire portion at the first-side main edge, and the main support is attached to the second-side wire portion at the second-side main edge.

Thus, the movement of the main support and of the ancillary support relative to the frame (of the backrest), in particular the rotational movements about an axis parallel to the elevation direction, will still more effectively be controlled.

Pursuant to a complementary or alternative feature according to the present description, preferably the structural core comprises a lower-wire portion extending in the transverse direction to the lower structural end between the first-side wire portion and the second-side wire portion, so that the first-side wire portion, the lower wire portion and the second-side wire portion form three successive parts of a single wire.

Thus, the number of members constituting the suspension system is reduced.

Pursuant to a complementary or alternative feature according to the present description, the wire is preferably made of steel.

Thus, the wire may have high properties of strength and elasticity.

In various embodiments of the suspension system according to the present disclosure, any and/or all the following arrangements may also be employed:

- the main support further comprises main elastic engagement members wherein the structural core is held;
- the ancillary support further comprises ancillary elastic engagement members wherein the structural core is held;
- the main support and the ancillary support are made of plastic material;
- the assembly further comprises a secondary support, the secondary support has a secondary plate (adjacent to and) extending along the extension of the main plate along the elevation direction, the main support is arranged between the ancillary support and the secondary support in the elevation direction, and the secondary support is attached to the structural core at the lower structural end;
- the main plate extends along the elevation direction between a main upper edge and a main lower edge, the central portion extends along the elevation direction between a central upper edge and a central lower edge, and the central lower edge extends opposite the main upper edge;
- the ancillary plate further has a first side lateral portion, and the first side lateral portion extends in the transverse direction from the central portion to a first side outer edge, located beyond the first side main edge;
- the first-side lateral portion extends in the elevation direction to a first-side lower edge (the central lower edge being located between the upper central edge and the first-side lower edge along the elevation direction), and the first-side lateral portion has a first-side inner edge extending opposite the first-side main edge;
- the suspension system has a plane of symmetry extending perpendicular to the transverse direction;
- the structural core has an upper attachment portion, a lower attachment portion and a holding portion, the upper attachment portion is arranged at the upper structural end and intended to be attached to the frame (of the backrest), the lower attachment portion is arranged at the lower structural end and intended to be attached to the frame (of the backrest), the holding portion extends along the elevation direction between the upper attachment portion and the lower attachment portion, and the main support is attached (directly) to the holding portion;

the upper portion is curved between 120 degrees and 180 degrees around the transverse direction, in order to form a hook for suspending the structural core on the frame (of the backrest);

the upper structural end is received in a bore of the ancillary support extending over at least 3 centimeters;

the lower portion is curved around the transverse direction between 80 degrees and 100 degrees, in order to allow the structural core to be elastically held on the frame (of the backrest).

The present disclosure further relates to a seat backrest comprising the above-mentioned suspension system and the frame (of the backrest), wherein the suspension system is held on the frame (of the backrest) by the structural core.

Preferably, the backrest further comprises a padding and a cover, and the padding is arranged between the cover and the main support and the ancillary support.

The invention claimed is:

1. A suspension system for a backrest of a vehicle seat, wherein the suspension system comprises:
a main support, the main support has a main plate, the main plate extends along a transverse direction between a first-side main edge and a second-side main edge,
an ancillary support, the ancillary support has an ancillary plate, the ancillary plate has a central portion extending along the extension of the main plate along an elevation direction perpendicular to the transverse direction, and
a structural core extending along the elevation direction between an upper structural end and a lower structural end, the upper structural end and the lower structural end are intended to be attached to a frame, the main support and the ancillary support are attached to the structural core.

2. The suspension system of claim 1, wherein the structural core comprises at least one wire having a cross-section comprised between 10 square millimeters and 100 square millimeters.

3. The suspension system of claim 2, wherein:
the structural core comprises a first-side wire portion and a second-side wire portion,
the first-side wire portion and the second-side wire portion are separated from one another in the transverse direction by a distance of at least 20 centimeters, and
the main support is attached to the first-side wire portion and to the second-side wire portion.

4. The suspension system of claim 3, wherein:
the main support is attached to the first-side wire portion at the first-side main edge, and
the main support is attached to the second-side wire portion at the second-side main edge.

5. The suspension system of claim 3, wherein the structural core comprises a lower-wire portion extending along the transverse direction at the lower structural end between the first-side wire portion and the second-side wire portion, so that the first-side wire portion, the lower-wire portion and the second-side wire portion form three successive parts of a single wire.

6. The suspension system of claim 1, wherein:
the main plate extends along the elevation direction between a main upper edge and a main lower edge,
the central portion extends along the elevation direction between a central upper edge and a central lower edge, and
the central lower edge extends opposite the main upper edge.

7. The suspension system of claim 6, wherein:
the ancillary plate further has a first-side lateral portion,
the first-side lateral portion extends along the transverse direction from the central portion to a first-side outer edge, located beyond the first-side main edge.

8. The suspension system of claim 7, wherein:
the first-side lateral portion extends along the elevation direction to a first-side lower edge, and
the first-side lateral portion has a first-side inner edge extending opposite the first-side main edge.

9. The suspension system of claim 1, wherein:
the structural core has an upper attachment portion, a lower attachment portion and a holding portion, the upper attachment portion is arranged at the upper structural end and intended to be attached to the frame, the lower attachment portion is arranged at the lower structural end and intended to be attached to the frame, the holding portion extends along the elevation direction between the upper attachment portion, and the lower attachment portion, and
the main support is attached to the holding portion.

10. A backrest comprising the suspension system according to claim 9 and the frame, wherein the suspension system is held on the frame by the structural core.

* * * * *